(12) United States Patent
Yamamoto et al.

(10) Patent No.: US 7,775,891 B2
(45) Date of Patent: Aug. 17, 2010

(54) BOOT FOR JOINT

(75) Inventors: Masafumi Yamamoto, Mooka (JP); Seiichi Sekito, Tochigi-ken (JP); Hideki Kobayashi, Utsunomiya (JP); Yuuki Miyashita, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 427 days.

(21) Appl. No.: 11/666,815

(22) PCT Filed: Nov. 18, 2004

(86) PCT No.: PCT/JP2005/021304

§ 371 (c)(1),
(2), (4) Date: May 1, 2007

(87) PCT Pub. No.: WO2006/054728

PCT Pub. Date: May 26, 2006

(65) Prior Publication Data

US 2008/0125232 A1 May 29, 2008

(30) Foreign Application Priority Data

Nov. 19, 2004 (JP) .............................. 2004-336088

(51) Int. Cl.
*F16D 3/84* (2006.01)
(52) U.S. Cl. ....................... 464/175; 464/905
(58) Field of Classification Search ................. 464/111, 464/173–175, 905; 277/634–636
See application file for complete search history.

(56) References Cited

U.S. PATENT DOCUMENTS

| 4,157,019 A * | 6/1979 | Von Allworden ............ 464/175 |
| 5,006,376 A * | 4/1991 | Arima et al. ................. 277/636 |
| 6,547,669 B1 | 4/2003 | Neviani |
| 7,056,219 B2 | 6/2006 | Toriumi et al. |
| 2005/0245319 A1 | 11/2005 | Sato |
| 2006/0040751 A1 | 2/2006 | Wittenbecher |

FOREIGN PATENT DOCUMENTS

| EP | 0 504 004 A1 * | 9/1992 | ............... 464/175 |
| EP | 1450060 A1 | 8/2004 | |
| EP | 1510713 A1 | 3/2005 | |
| EP | 1512880 A1 | 3/2005 | |
| JP | 4-124338 | 11/1992 | |
| JP | 10-110738 A | 4/1998 | |
| JP | 10-196673 A | 7/1998 | |
| JP | 2000-079634 | 3/2000 | |
| JP | 2002-286048 | 10/2002 | |
| JP | 2003-504583 A | 2/2003 | |

(Continued)

*Primary Examiner*—Greg Binda
(74) *Attorney, Agent, or Firm*—Birch, Stewart, Kolasch & Birch, LLP

(57) ABSTRACT

A boot for a joint, wherein an equal-diameter part and thick-walled parts are formed on the inner peripheral wall of a large diameter tube part. A first tapered part extending from the equal-diameter part is continued with a second tapered part formed at the thick-walled parts in the circumferential direction. The diameter reducing ends of the first tapered part and the second tapered part are located at the same position, and a thin-walled part engaged with an annular groove formed in the outer member of a constant-velocity joint is continued with the diameter reducing end.

3 Claims, 10 Drawing Sheets

FOREIGN PATENT DOCUMENTS

| | | |
|---|---|---|
| JP | 2003-194093 A | 7/2003 |
| JP | 2004-108591 A | 4/2004 |
| JP | 2004-138175 | 5/2004 |
| JP | 2004-263730 A | 9/2004 |
| JP | 2005-061435 | 3/2005 |
| WO | WO-2004/044446 A1 | 5/2004 |

* cited by examiner

FIG. 9

|  | ANGLE OF INTERSECTION $\theta$ (deg.) | | | | | | |
| --- | --- | --- | --- | --- | --- | --- | --- |
|  | 30 | 35 | 40 | 45 | 50 | 55 | 60 |
| ASSEMBLY CAPABILITY | △ | ○ | ◎ | ◎ | ◎ | ○ | △ |
| SEALING ABILITY | ○ | ◎ | ◎ | ◎ | ◎ | ◎ | ○ |

BOOT FOR JOINT

TECHNICAL FIELD

The present invention relates to a boot for a joint, one end of which is tightly fastened to a constant velocity universal joint outer member, and the other end of which is tightly fastened to a side peripheral wall of an axel member.

BACKGROUND ART

In automotive vehicles, the rotational power (motive force) generated by various types of engines such as internal combustion engines, motors and the like is transmitted to a hub from a differential gear via plural transmission shafts made up of a half shaft, a spline shaft, etc., thereby tires thereof rotate.

The differential gear and the spline shaft are connected to each other through a so-called inboard side constant velocity universal joint, whereas the spline shaft and hub are connected to each other through a so-called outboard side constant velocity universal joint. In such constant velocity universal joints, a hollow outer member with one end thereof open is provided, wherein a rubber or resin formed joint boot is installed so as to extend from the outer member over the various transmission shafts.

Generally, the external diameter of the outer member is large in comparison with the diameter of the transmission shafts, and as a result, the joint boot is equipped with a large diameter cylindrical portion tightly fastened to the outer peripheral wall of the outer member, and a smaller diameter cylindrical portion tightly fastened to a side peripheral wall of the transmission shaft, wherein a bellows portion intervenes between the large diameter cylindrical portion and the small diameter cylindrical portion, the bellows portion becoming gradually smaller in diameter in a direction from the large diameter cylindrical portion toward the small diameter cylindrical portion. The large diameter cylindrical portion and the small diameter cylindrical portion are tightly fastened onto the outer member outer peripheral wall and the transmission shaft side peripheral wall via securing members formed, for example, of metal bands or the like.

In these types of joint boots, the boots are provided with seal members, which function to retain grease enclosed beforehand within the joint boot, as well as to prevent the entry of water, sludge, and other foreign matter into the joint boot from the outside.

Recently, in the interests of making automotive vehicles lighter in weight, it is desired that each of the members and components making up the automotive vehicle be made lightweight. From this perspective, with respect to the outer member of the constant velocity universal joint, for example, recesses are disposed at various locations, in the form of portions of the wall of the constant velocity universal joint being cut out. In this case, on the inner circumferential wall in the vicinity of the open end of the large diameter cylindrical portion of the joint boot, a plurality of thick-walled parts are disposed for insertion into each of the aforementioned recesses.

However, when the larger diameter cylindrical portion is tightly fitted onto the outer member, the positions lying between each of the thick-walled parts (hereinafter referred to as thin-walled parts) of the large diameter cylindrical portion expand, and as a result thereof, gaps tend to arise between the recesses and the thick-walled part. When this situation occurs, grease is lost by leakage through the gaps, and water or dust and the like intrudes via the gaps.

To avoid this kind of failure, in Japanese Laid Open Patent Application No. 10-110738, it is proposed that grooves should be disposed on the thick-walled part, which follow along the axial direction of the outer member (i.e., in a direction perpendicular to the diametrical direction of the roughly circular opening of the outer member). Further, Japanese Laid Open Patent Application No. 10-196673 proposes that extending lips should be provided along a circumferential direction at the boundary between a thick-walled part and a thin-walled part.

Apart from the above, in Japanese Laid Open Patent Application Nos. 2003-194093 and 2004-108591, it is proposed that a volume release hole, and a release clearance, be provided for the thick-walled part.

DISCLOSURE OF THE INVENTION

Notwithstanding, in any of the techniques disclosed in Japanese Laid Open Patent Application No. 10-110738; Japanese Laid Open Patent Application No. 10-196673; Japanese Laid Open Patent Application No. 2003-194093 and Japanese Laid Open Patent Application No. 2004-108591, inconveniences arise in that the mold structures for forming the joint boots from raw materials are complex, and the molding operation itself cannot easily be performed. Furthermore, in the case where lips are provided, owing to the existence of such lips, it becomes difficult to insert the outer member into the large diameter cylindrical portion.

A principal object of the present invention is to provide a joint boot which is easily constructed and formed.

A further object of the present invention is to provide a joint boot having a large diameter cylindrical portion into which an outer member can easily be inserted.

In accordance with a first embodiment of the present invention, a joint boot is provided, wherein the joint boot is equipped with a large diameter cylindrical portion that is tightly fastened onto an outer peripheral wall of an outer member of a constant velocity universal joint, a small diameter portion that is tightly fastened onto a side peripheral wall of a shaft member, and a bellows that intervenes between the large diameter cylindrical portion and the small diameter cylindrical portion, the bellows becoming reduced in diameter from the large diameter cylindrical portion toward the small diameter cylindrical portion, wherein the large diameter cylindrical portion has a thin-walled part with a smaller inner diameter as compared with an opening, wherein a first tapered part is provided from the opening up to the thin-walled part, whereby an inner diameter of the large diameter portion becomes reduced in diameter toward the small diameter cylindrical portion, wherein a thick-walled part, which is inserted in a recess disposed on an outer peripheral wall of the outer member, is disposed on an inner peripheral wall of the large diameter cylindrical portion, and wherein the thick-walled part has a second tapered part starting from an end of the opening, whereby the internal diameter of the large diameter cylindrical portion becomes reduced in diameter toward the small diameter cylindrical portion, the second tapered part extending circumferentially over the first tapered part and having the same reduced diameter ending point as that of the first tapered part.

With the joint boot constructed in this manner, because the first and second tapered parts exist within the large diameter cylindrical portion, when the outer member of the constant velocity universal joint is inserted into the large diameter cylindrical portion, corner parts of the outer member abut against the first tapered part and the second tapered part, whereby in the force applied for inserting the outer member, components of force are generated, which act in directions so as to enlarge the large diameter cylindrical portion. In other words, since the large diameter cylindrical portion can easily be enlarged, the outer member can easily be inserted thereinto.

Further, when the joint boot is rotated relatively with respect to the outer member so as to properly position the recesses of the outer member with the thick-walled parts, the outer member is easily rotated relatively along the first tapered part and the second tapered part. Stated otherwise, such positioning can easily be carried out.

In essence, according to the present invention, ease of assembly capability is improved.

In addition, since the joint boot having such a structure can be formed using a mold that comprises tapered portions therein for providing the first tapered part and the second tapered part, it is unnecessary to fabricate a mold of a complex shape. Accordingly, the joint boot thus formed is advantageous in cost.

Furthermore, when the molded body is taken out from the mold, the first tapered part and the second tapered part do not become a hindrance, and accordingly, molding operations do not become complicated.

In the joint boot, it is preferable for the angle of intersection between an imaginary line that extends from the first tapered part and the second tapered part, and the diameter of the large diameter cylindrical portion to be in the range of 35° to 55°. In this case, insertion of the outer member is made remarkably easy, and moreover, after a fastening member such as a mounting band or the like has been installed, the sealing ability of the joint boot is quite excellent.

Still further, in the large diameter cylindrical portion, it is preferable to provide a constant diameter part that extends from the opening of the large diameter cylindrical portion and continues to the first tapered part in a direction perpendicular to the circumferential direction. When a thin-walled part is inserted into an annular groove disposed on the outer wall surface of the outer member, the boundary between the constant diameter part and the first tapered part abuts against a boundary between the outer wall surface of the outer member and the annular groove. As a result of such abutment, further insertion of the outer member is restricted, and hence, the joint boot is easily positioned.

Still further, it is preferable for the reduced diameter end point of the first tapered part and the second tapered part to lie within a range of the widthwise dimension of the mounting groove for the fastening member, which is disposed on the outer peripheral wall of the large diameter cylindrical portion. In this case, in the joint boot, the effective area over which the fastening force of the fastening member acts becomes smaller, compared to the case in which the reduced diameter end point is positioned on a side more closely to the opening than the large diameter cylindrical portion opening side end of the mounting groove for the fastening member. As a result, since a large fastening force acts on the thin-walled part, the large diameter cylindrical portion can be strongly and solidly fastened. Stated otherwise, the sealing ability of the joint boot can be further improved.

BRIEF DESCRIPTION OF THE DRAWINGS

FIG. 9 is a chart illustrating the relationship between an intersecting angle θ, and ease of assembly of the joint boot and sealing capability.

BEST MODE FOR CARRYING OUT THE INVENTION

A preferred embodiment of a joint boot according to the present invention shall be given below and explained in detail with reference to the attached drawings.

Figure 1:
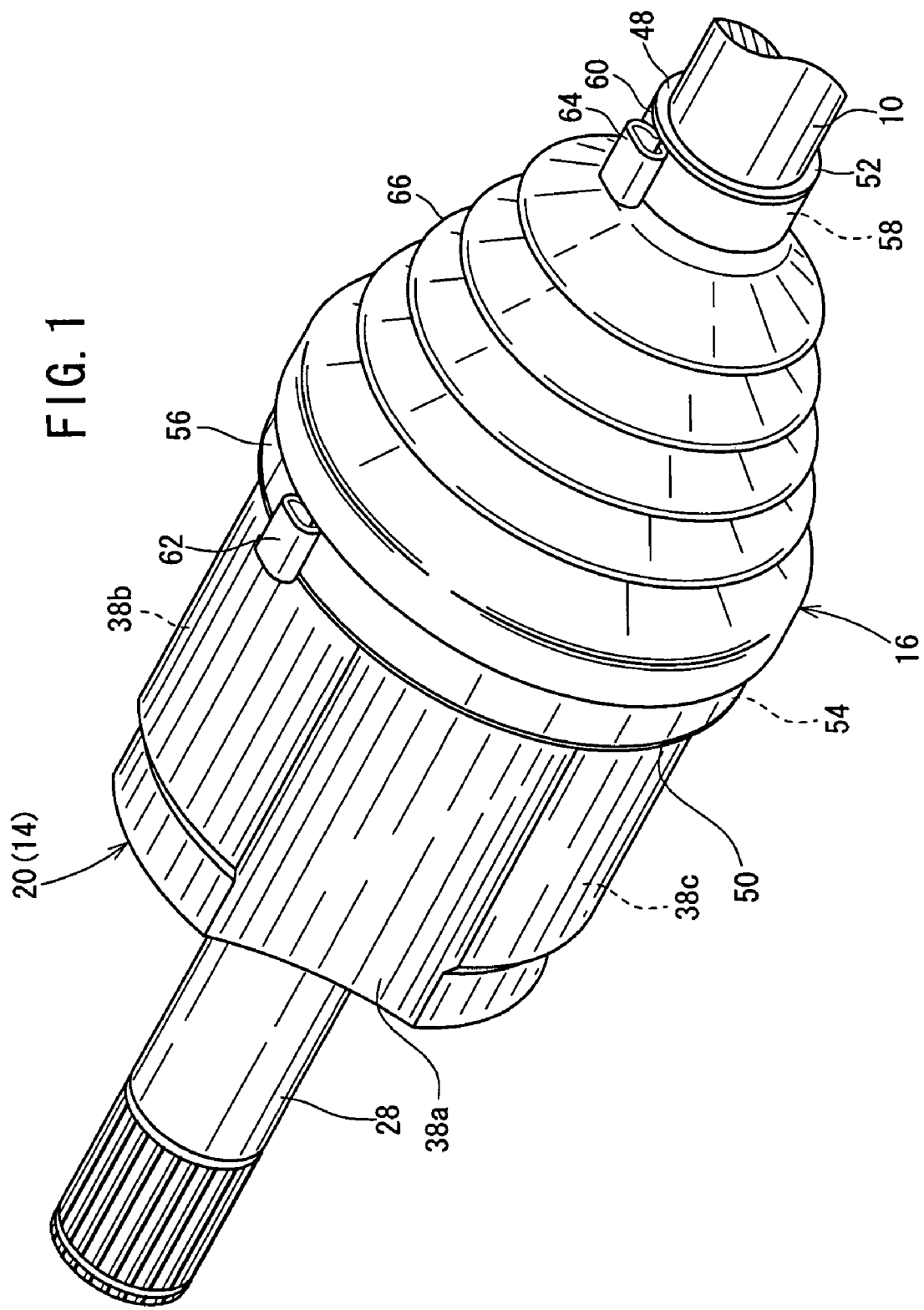
FIG. 1 is a schematic perspective view illustrating principal features of a motive force transmission mechanism, having a joint boot according to an embodiment of the present invention installed thereon.
Figure 2:
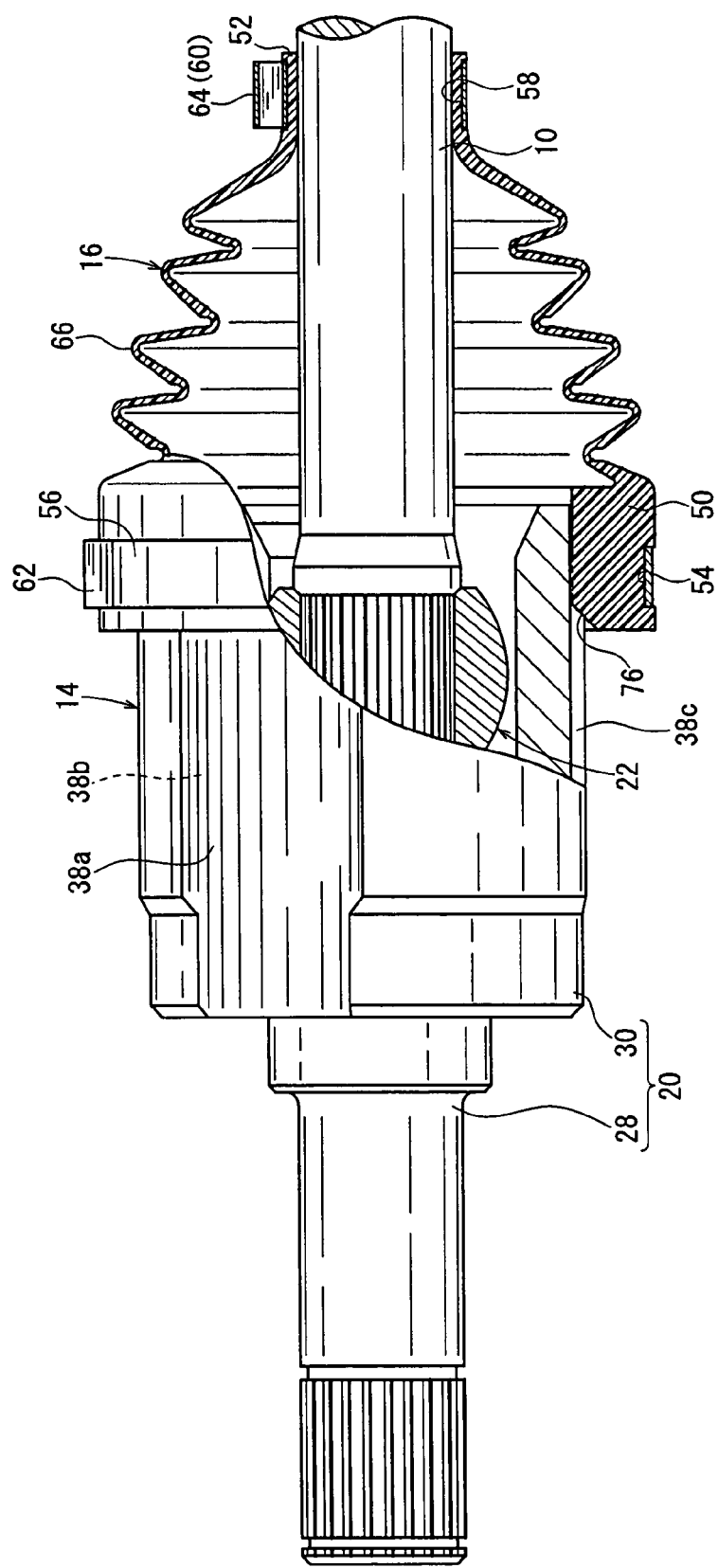
FIG. 2 is a side view, with partial cutaway, of the region shown in FIG. 1.

First, FIG. 1 is a schematic perspective view illustrating principal features of a joint boot according to an embodiment of the present invention, which is installed on a motive force transmission mechanism for transmitting a driving force from an engine to automobile tires. A partially cutaway side surface view thereof is shown in FIG. 2. In FIGS. 1 and 2, reference numeral 10 indicates a spline shaft that is connected to a non-illustrated hub, wherein the spline shaft 10 is connected to an unillustrated half shaft through a tripod type constant velocity universal joint 14, which is a sliding type of constant velocity universal joint. In addition, a joint boot 16 according to the present embodiment is installed thereon so as to extend from the tripod type constant velocity universal joint 14 and over the spline shaft 10.

Figure 3:
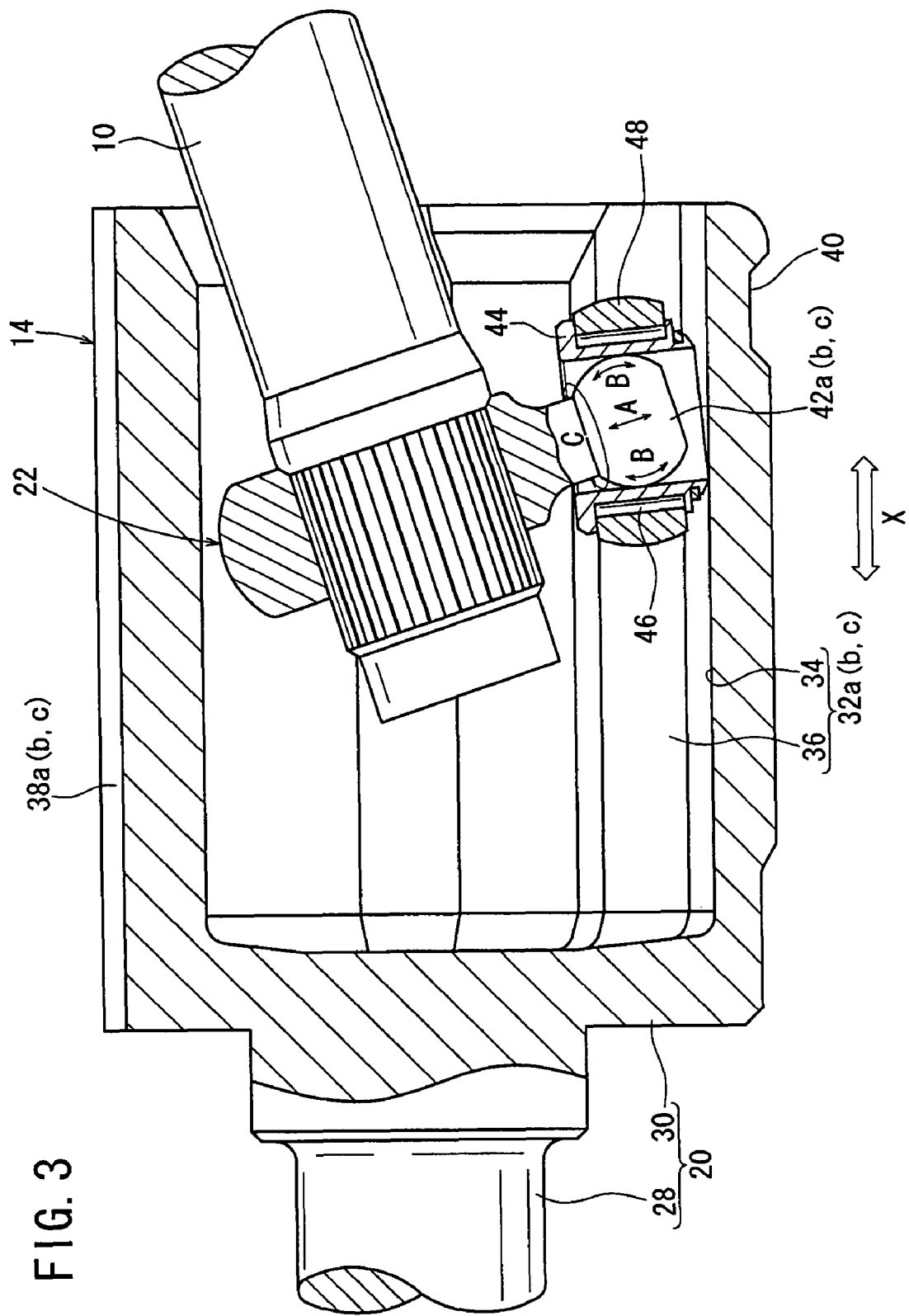
FIG. 3 is a schematic cross-sectional view illustrating principal features of a constant velocity universal joint shown in FIG. 2, in which features of the joint boot have been omitted.

As shown in FIG. 3, in which the joint boot 16 has been omitted, the tripod type constant velocity universal joint 14 includes an outer member 20 and an inner member 22 that is inserted inside the outer member 20. Among these elements, on the outer member 20, there are disposed an elongate axis member 28 and a tubular member 30 disposed on one end of the axis member 28. The aforementioned half shaft, extending from an unillustrated differential gear, also is connected to the axis member 28.

Figure 4:
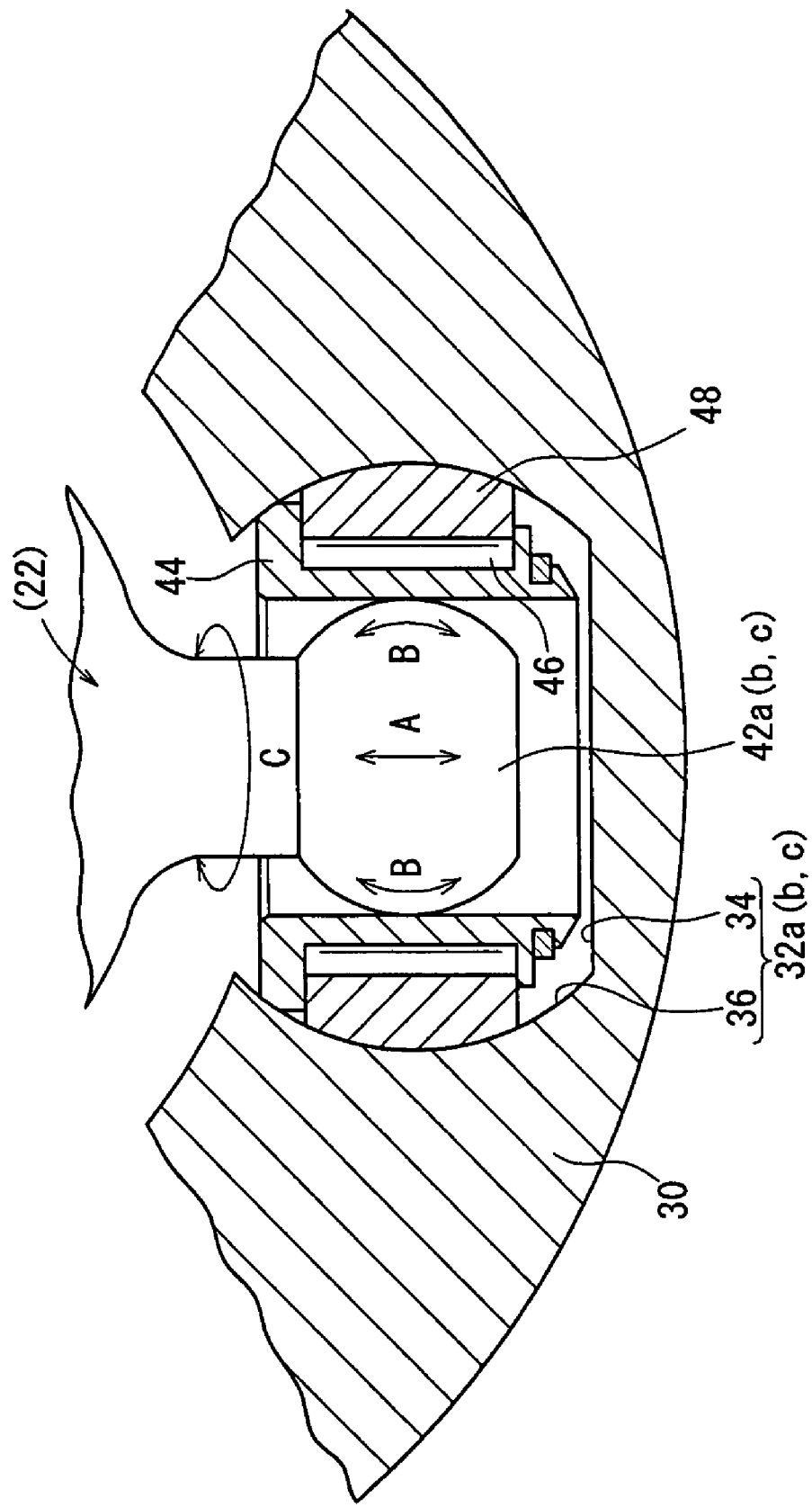
FIG. 4 is an enlarged frontal end view of principal features of the constant velocity universal joint of FIG. 2.

Further, as shown in FIGS. 3 and 4, guide grooves 32a to 32c, which extend along an axial direction of the outer member 20 and are mutually separated from each other by angles of 120°, are formed on an inner wall surface of the tubular member 30. The guide grooves 32a to 32c are each constructed of a ceiling portion 34, disposed in a direction extending along an outer peripheral surface of the tubular member 30, and rolling surfaces 36 serving as sliding portions disposed in facing relation to each other along a direction substantially perpendicular to the aforementioned ceiling portion 34.

In order to make the tubular member 30 lighter in weight, on the outer wall surface of the tubular member 30 recess grooves (recesses) 38a to 38c are disposed respectively at three locations separated mutually from each other at equal intervals, the recess grooves 38a to 38c each being formed by so-called thickness reduction, with an inwardly collapsed shape along the axial direction of the outer wall of the tubular member 30. Further, an annular groove 40 for insertion of thin-walled parts (to be discussed later) of the joint boot 16 is disposed along a circumferential direction thereof (see FIG. 3).

On the other hand, the inner member 22 that is connected to the end of the spline shaft 10 is inserted into a hollow internal portion of the tubular member 30 (see FIGS. 2 and 3). As shown in FIG. 4, three trunnions 42a to 42c, which point toward the guide grooves 32a to 32c and expand outwardly, are formed integrally on the inner member 22. The trunnions 42a to 42c are mutually separated from each other at 120° angular intervals.

Cylindrical holders 44 are fitted externally respectively over each of the outer wall portions of the trunnions 42a to 42c. The inner wall surfaces of the holders 44 are formed along a straight line, whereas the outer wall portions of the trunnions 42a to 42c are curved (see FIG. 4). As a result thereof, each of the trunnions 42a to 42c is slidable in the direction of the arrow A in FIG. 4, and more specifically, is slidable along an axial direction of the holder 44, and further, is tiltable through a predetermined angle in the direction of the arrows B with respect to the holder 44. Furthermore, each of the trunnions 42a to 42c is also rotatable in the direction of the arrow C.

An upper end part of the holder 44 projects toward the ceiling portion 34 further than a flat and smooth end surface of each of the trunnions 42a to 42c, the holder 44 being positioned so as to form a slight clearance between itself and the ceiling portion 34.

A roller 48 is fitted over an outer circumference of the holder 44 via a plurality of needle bearings 46. A curved side wall portion of the roller 48 is in slidable contact with respect to the rolling surface 36 of each of the guide grooves 32a to 32c, and therefore, each of the rollers 48 is slidable along the rolling surface 36 inside of the tubular member 30 in the direction of the arrow X shown in FIG. 3. As a result, the inner member 22 is displaceable relative to the tubular member 30.

The joint boot 16 according to the present embodiment is positioned in a surrounding manner, extending from a part of the outer member 20 of the tripod type constant velocity universal joint 14, constructed as described above, to an end of the spline shaft 10.

Figure 5:
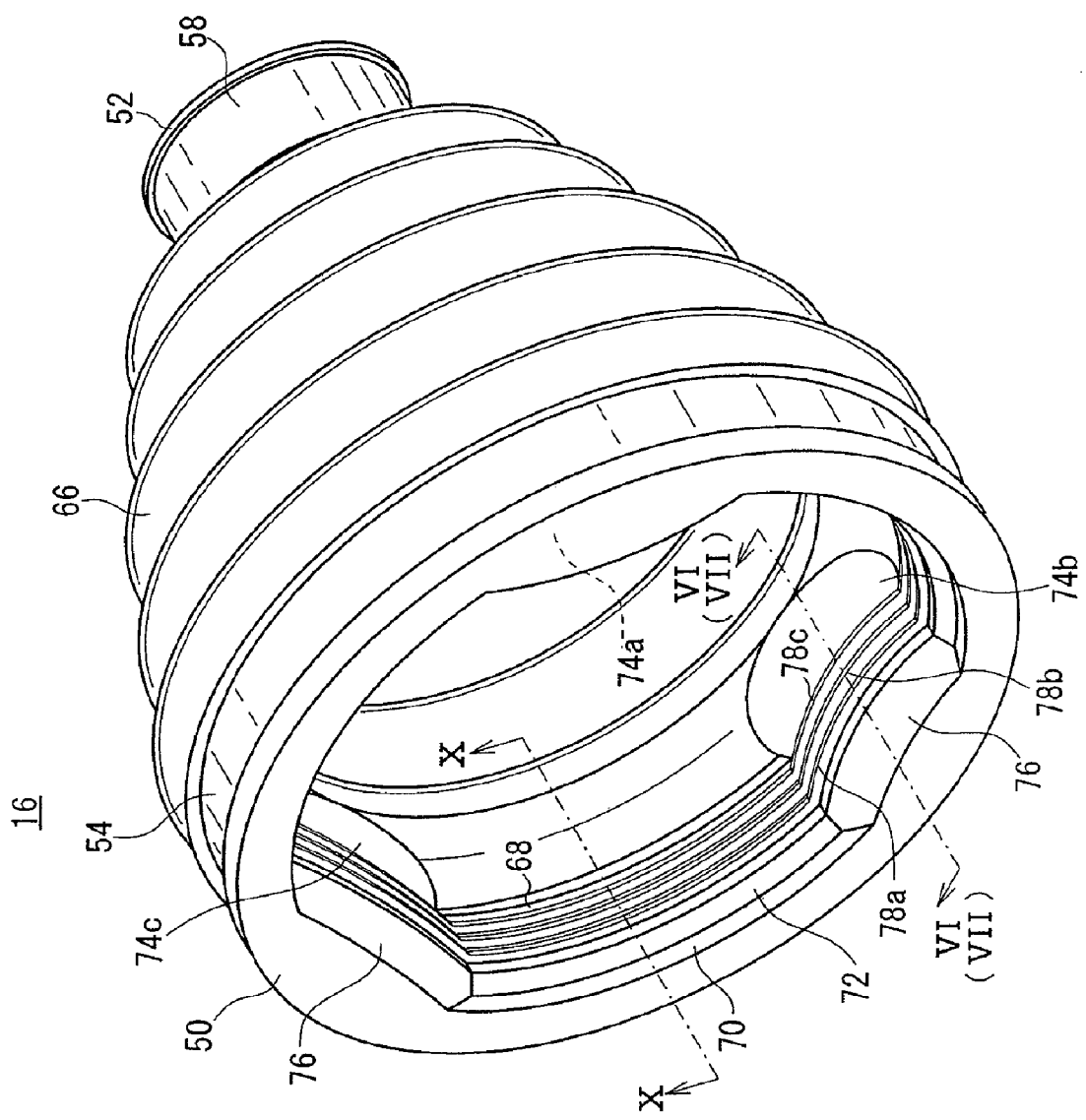
FIG. 5 is an overall schematic perspective view of the joint boot according to the embodiment of the present invention.

As shown in FIGS. 1, 2 and 5, the joint boot 16 has a large diameter cylindrical portion 50 wherein the opening diameter at one end thereof corresponds to the outer diameter of the outer member 20. The joint boot 16 further has a small diameter cylindrical portion 52, wherein the opening diameter at the other end thereof corresponds to the diameter of the spline shaft 10.

An annular band installation groove 54 in the form of a depression having a predetermined width is formed on the outer peripheral wall of the large diameter cylindrical portion 50, wherein a fixing band 56 (see FIGS. 1 and 2) is mounted in the band installation groove 54. On the other hand, another annular band installation groove 58 (see FIG. 5) in the form of a depression having a predetermined width is formed on the outer periphery of the small diameter cylindrical portion 52, wherein a fixing band 60 is mounted in the band installation groove 58. A part of the outer peripheral surface of each of the fixing bands 56, 60 can be clamped (caulked) by pinching from both directions by means of an unillustrated caulking jig. Thus, the fixing band 56 is installed in the band installation groove 54 in surrounding relation to the outer wall surface of the tubular member 30 via the large diameter cylindrical portion 50, the fixing band 60 is installed in the band installation groove 58 in surrounding relation to the outer peripheral wall of the spline shaft 10 via the small diameter cylindrical portion 52, and as a result, each of the large diameter cylindrical portion 50 and the small diameter cylindrical portion 52 are tightly fastened respectively onto the outer peripheral wall of the tubular member 30 and the outer peripheral wall of the spline shaft 10. Grease composition preliminarily fills up the joint boot 16 before both of the fixing bands 56, 60 are clamped. The grease composition is sealed in the joint boot 16 by the above tightly fastening.

In FIGS. 1 and 2, reference numerals 62 and 64 indicate crimped portions, projecting in a radial outward direction for a given length, which are formed when the outer peripheral surfaces of the aforementioned fixing bands 56, 60 are subjected to caulking.

Further, between the large diameter cylindrical portion 50 and the small diameter cylindrical portion 52 of the joint boot 16, a bellows member 66 intervenes, the bellows member 66 having mutually interconnected concave and convex portions, and contracting in diameter as it extends from the large diameter cylindrical portion 50 toward the small diameter cylindrical portion 52.

As shown in FIG. 5, the large diameter cylindrical portion 50 has a thin-walled part 68, the diameter of which is smaller compared to the end of the large diameter cylindrical portion 50, and further, which extends between respective thick-walled parts 74a to 74c to be described below.

In addition, extending from the opening up to the thin-walled part 68, a constant diameter part 70 is provided that extends along the longitudinal direction of the joint boot 16, and a first tapered part 72 is provided which reduces the inner diameter of the large diameter cylindrical portion 50 toward the small diameter cylindrical portion 52. Specifically, the inner diameter of the large diameter cylindrical portion 50 is uniform over the constant diameter part 70, while the inner diameter becomes contracted from the first tapered part 72 up to the thin-walled part 68.

Thick-walled parts 74a to 74c are disposed at three locations along the inner circumferential wall of the large diameter cylindrical portion 50, which are expanded and point inwardly in diametrical directions. Each of the thick-walled parts 74a to 74c is for insertion respectively into the recess grooves 38a to 38c.

The thick-walled parts 74a to 74c each has a second tapered part 76, with a starting point at the opening, and which contracts (reduces) the inner diameter of the large diameter cylindrical portion 50 toward the small diameter cylindrical portion 52. Each of the second tapered parts 76 runs or extends circumferentially over both the constant diameter part 70 and the first tapered part 72. Moreover, the diameter reducing end points of the second tapered parts 76 and the first tapered part 72 are the same.

Figure 6:
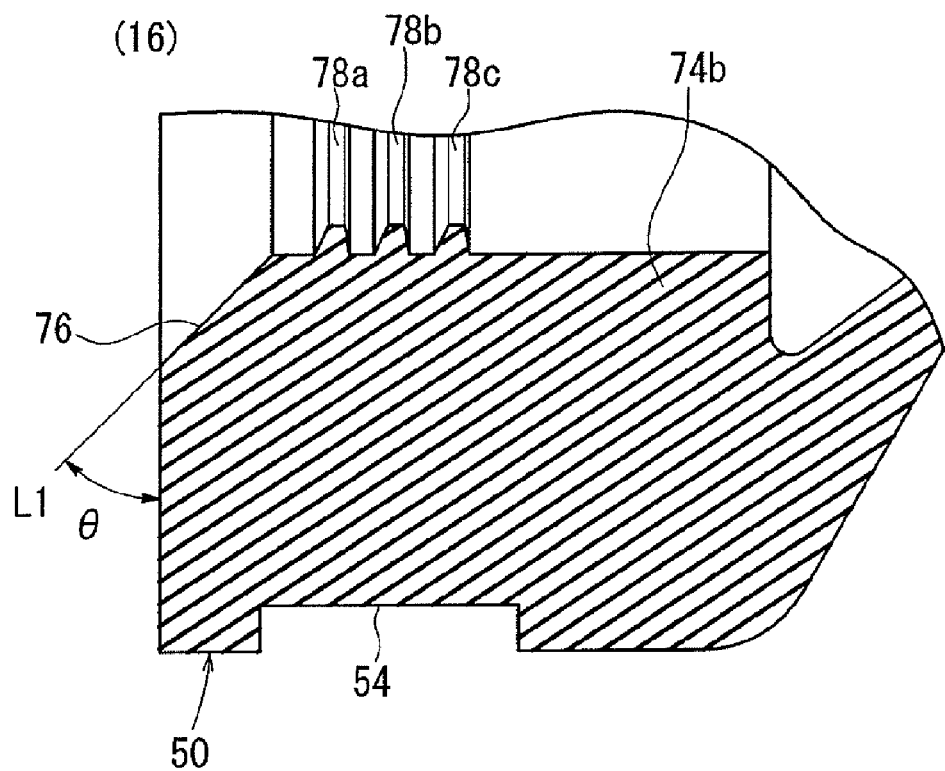
FIG. 6 is an enlarged cross-sectional view taken along line VI-VI in FIG. 5 illustrating principal parts in the vicinity of the opening of a large diameter cylindrical portion in the joint boot of FIG. 5.

An enlarged cross-sectional view taken along the axial direction of the large diameter cylindrical portion 50 is shown in FIG. 6 which is taken along the line VI-VI in FIG. 5. The first tapered part 72 and the second tapered part 76 are inclined at the same angle. For reasons to be described below, an angle of intersection θ between an imaginary line Ll, extending from the first tapered part 72 and the second tapered part 76, and the diameter of the large diameter cylindrical portion 50 is preferably set to be within a range from 35° to 55°, and more preferably, within a range from 40° to 50°.

Further, as shown in FIG. 6, the diameter reducing end points of the first tapered part 72 and the second tapered part 76 are disposed more closely toward the side of the small diameter cylindrical portion 52, as compared with an end in the band installation groove 54 on a side of the opening of the large diameter cylindrical portion 50. More specifically, the starting point of the thin-walled part 68 is positioned inside a range of the widthwise dimension of the band installation groove 54.

In addition, three annular projections 78a to 78c are disposed along the circumferential direction on the thin-walled part 68. The annular projections 78a to 78c also go around the inner circumferential wall of the large diameter cylindrical portion 50 by way of the thick-walled parts 74a to 74c.

The joint boot 16 according to the present embodiment is basically constructed as described above. Next, operations and effects of the joint boot 16 shall be explained.

Attachment of the joint boot 16 with respect to a tripod type constant velocity universal joint 14 is conducted in the following manner. First, the small diameter cylindrical portion 52 is inserted onto the spline shaft 10, and the inner member 22 that is assembled on the spline shaft 10 is inserted into the tubular member 30. The rollers 48 are inserted such that the curved side wall portions of the rollers 48 are slidable against the rolling surfaces 36 of the guide grooves 32a to 32c.

Figure 7A:
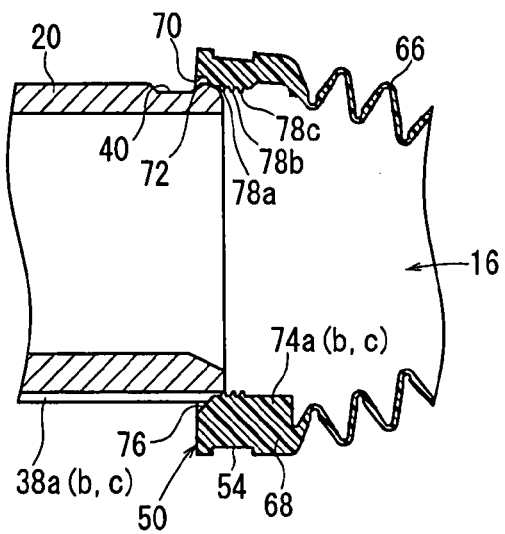
FIGS. 7A to 7C are partial cross-sectional explanatory views with a lower portion in the figures being taken along line VII-VII in FIG. 5, showing a state in which a tubular member is inserted into the large diameter cylindrical portion.

Next, as shown in FIG. 7A, the tubular member 30 making up the tripod type constant velocity universal joint 14 is inserted into the large diameter cylindrical portion 50. In FIG. 7A, as well as in the explanations to follow, the spline shaft 10, the inner member 22, and so forth, have been omitted from illustration. The lower portion of FIGS. 7A-7C illustrating the second tapered part 76 and the thick-walled parts 74a-74c are taken along line VII-VII in FIG. 5.

At the time that the tubular member 30 is inserted into the large diameter cylindrical portion 50, it is acceptable for the circumferential positions of the thick-walled parts 74a to 74c of the joint boot 16 to be roughly positioned, only insofar as possible, in matching agreement with the positions of the recess grooves 38a to 38c on the tubular member 30. It is not required for the thick-walled parts 74a to 74c to agree exactly with the positions of the recess grooves 38a to 38c.

Upon insertion, since the first tapered part 72 and the second tapered parts 76 are disposed on the inner circumferential wall of the joint boot 16, and in particular when the corner part of the tubular member 30 abuts against the second tapered parts 76, as a result of the second tapered parts 76, within the force used for insertion of the tubular member 30, components of force are generated in directions that act to expand the joint boot 16. Owing to this feature, the joint boot 16 is easily expanded, and as a result, insertion of the tubular member 30 into the joint boot 16 can easily be carried out.

Figure 7B:
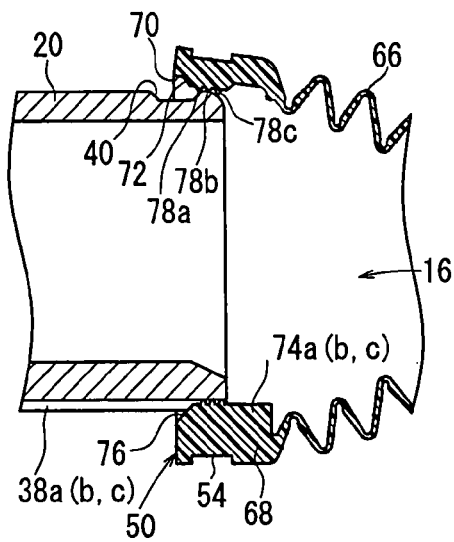
Figure 7C:
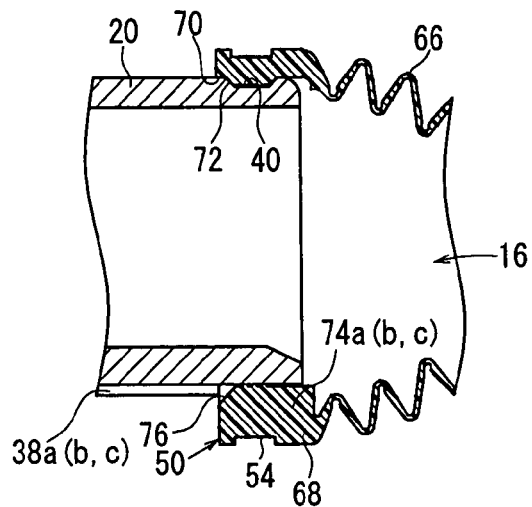

Further, as shown in FIGS. 7B and 7C, the tubular member 30 is inserted until the thin-walled part 68 of the joint boot 16 engages with the annular groove 40. Insertion is then completed by the boundary between the constant diameter part 70 and the first tapered part 72 coming into abutment with a boundary between the annular groove 40 and the outer wall surface of the tubular member 30, whereby positioning of the joint boot 16 can easily be carried out.

Figure 8A:
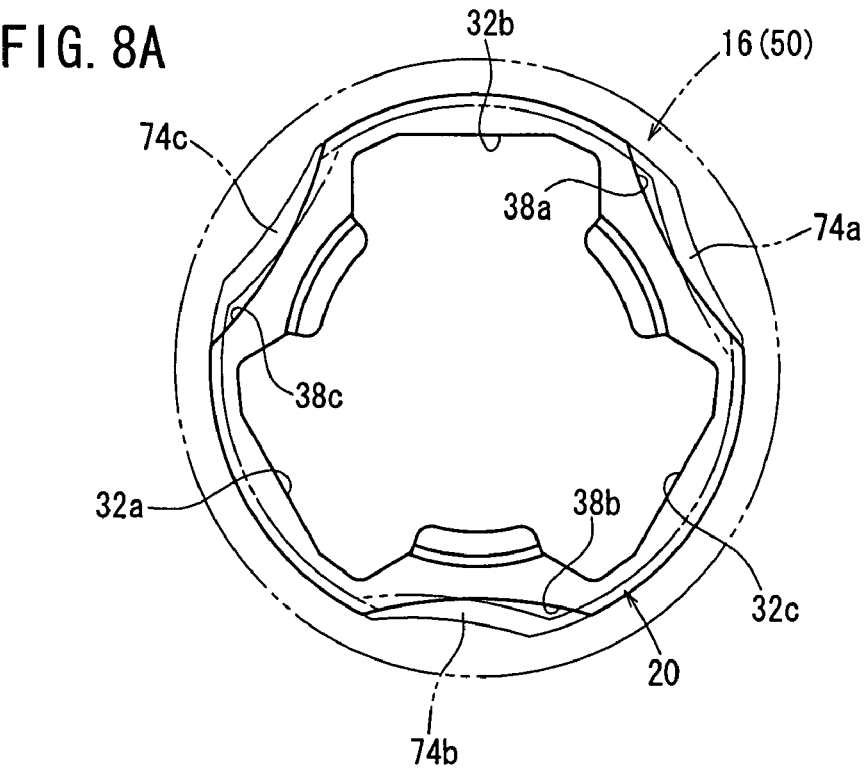
FIGS. 8A and 8B are frontal explanatory views, showing a state in which thick-walled parts and recesses are inserted into alignment with each other.
Figure 8B:
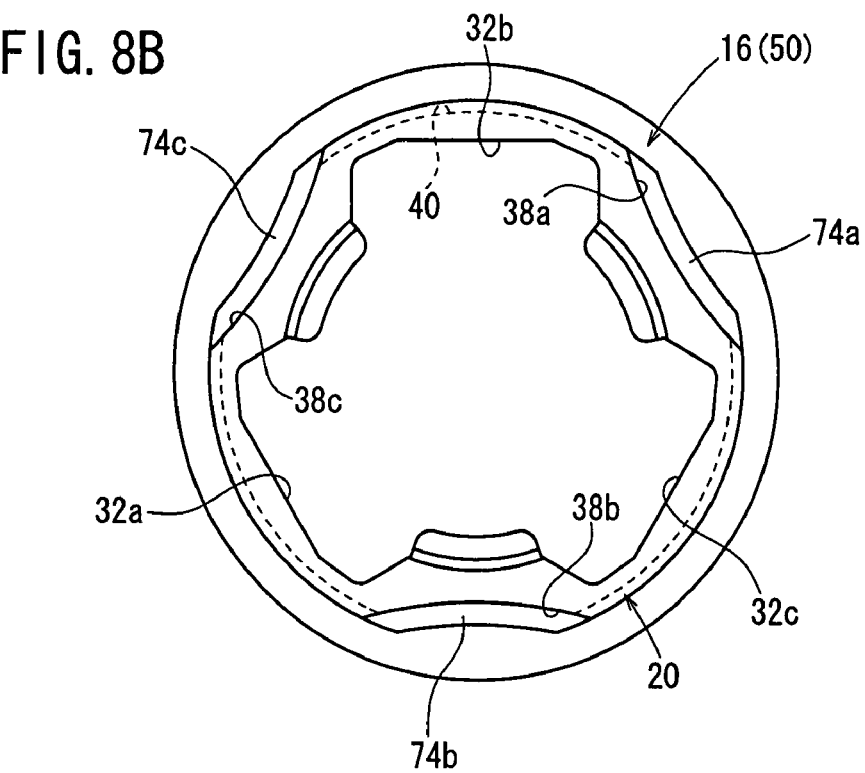

Thereafter, as shown in FIG. 8A, in the event that the positions of the thick-walled parts 74a to 74c do not match with the positions of the recess grooves 38a to 38c, the joint boot 16 and the tubular member 30 are rotated relative to each other, whereby as shown in FIG. 8B, positioning of the thick-walled parts 74a to 74c and the recess grooves 38a to 38c is carried out.

When such positioning is performed, the tubular member 30 is rotated easily relative to the joint boot 16 along the first tapered part 72 and the second tapered part 76. Stated otherwise, owing to the provision of the first tapered part 72 and the second tapered part 76, mutual positioning of the thick-walled parts 74a to 74c with respect to the recess grooves 38a to 38c is made remarkably easy.

In this manner, in the joint boot 16, by providing the first tapered part 72 and the second tapered part 76 on the inner circumferential wall of the large diameter cylindrical portion 50, attachment (assembly) of the joint boot 16 with respect to the tripod type constant velocity universal joint 14 is made easy.

Thereafter, the fixing band 56 (see FIGS. 1 and 2) is mounted in the band installation groove 54, whereas the fixing band 60 is mounted in the band installation groove 58 (see FIG. 5). Portions of the outer peripheral surfaces of the fixing bands 56, 60 are clamped (caulked) by pinching from both directions using of an unillustrated caulking jig, wherein accompanying such caulking, crimped portions 62, 64 are formed, which project on the outer peripheral surfaces of the fixing bands 56, 60. Thus, the large diameter cylindrical portion 50 and the small diameter cylindrical portion 52 are tightly fastened respectively onto the outer peripheral wall of the outer member 20 and the outer peripheral wall of the spline shaft 10.

In the present embodiment, as noted above, the starting point of the thin-walled part 68 is positioned inside a range defined by the widthwise dimension of the band installation groove 54 (see FIG. 6). In this case, the area of the thin-walled part 68 that is compressed accompanying fastening of the fixing band 56 becomes smaller, as compared to the case in which the thin-walled part has a starting point positioned more forwardly (to the side of the opening of the large diameter cylindrical portion 50) than the side edge of the band installation groove 54 proximate the opening of the large diameter cylindrical portion 50. Owing thereto, because a large tightening force acts on the thin-walled part 68, the large diameter cylindrical portion 50 can be very tightly fastened, and thus, the sealing ability of the joint boot 16 can be improved. Moreover, at this time, the annular projections 78a to 78c are compressed and flattened by the annular groove 40.

Accompanying driving of the automotive engine, rotational force is transmitted from the differential gear to the half shaft and the inner member 22 via the outer member 20 of the tripod type constant velocity universal joint 14, whereby the spline shaft 10 undergoes rotary motion in a given direction.

When the car is driven, accompanying up and down movements of the vehicle tires, in response to unevenness or bumpiness of the road, the spline shaft 10 is displaced upward and downwardly. Further, when a vehicle driver operates the handle or steering wheel, the spline shaft 10 is subjected to forward and backward (advancing/retreating) movements. At this time, in the joint boot 16, corresponding displacements and movements of the spline shaft 10 occur, in accordance with expansion and bending of the bellows member 66.

During driving a sealing function is performed, such that grease enclosed inside the interior of the joint boot 16 is maintained, and wherein moisture, including rainwater, dust and the like, are prevented from invading into the interior parts of the tripod type constant velocity universal joint 14. Moreover, such a sealing function changes depending on the aforementioned angle of intersection θ (see FIG. 6) that is made by the first tapered part 72 and the second tapered part 76.

FIG. 9 illustrates the relationship between the angle of intersection θ and ease of assembly of the joint boot 16 on the tubular member 30, as well as the sealing capability of the joint boot 16. FIG. 9, "assembly capability" is indicated by the marks "double circle", "circle" and "triangle" which represent, respectively, that "assembly is remarkably easier", "assembly is easier" and "same degree" wherein the degree of ease of assembly is indicated in comparison with a joint boot that does not have the first tapered part 72 and the second tapered part 76 disposed thereon. Further, "sealing ability" is indicated by the marks "double circle" and "circle" which mean, respectively, that "the sealing ability is remarkably superior" and "the sealing ability is superior" wherein the degree of superiority of sealing ability is indicated in comparison with a joint boot that does not have the first tapered part 72 and the second tapered part 76 disposed thereon.

It can be understood from FIG. 9 that by setting the angle of intersection θ to be in a range of 35° to 55°, and more preferably in the range of 40° to 50°, a joint boot 16 can be constructed in which assembly thereof is made remarkably easy, and further, wherein the sealing ability thereof is remarkably superior.

Further, it is acceptable if the mold for forming the joint boot 16 from a resin or rubber fluid (molten material) is formed merely of tapered portions for creating the first tapered part 72 and the second tapered part 76, and there is no particular need for other parts. In other words, there are no large costs associated with fabrication of a complex type of die. Furthermore, when the molded body is taken out from the mold, the first tapered part 72 and the second tapered part 76 do not become a hindrance, and accordingly, molding operations do not become complicated.

In the above-described embodiment, the ending point of the first tapered part 72 and the second tapered part 76 was made to lie within the widthwise dimension of the band installation groove 54. However, the invention is not particularly restricted to this feature. So long as the fastening (clamping) force can be ensured, it is acceptable for the positioning thereof to be more frontward than that of the band installation groove 54.

Further, as clamping members for tightly fastening each of the large diameter cylindrical portion 50 and the small diameter cylindrical portion 52, the invention is not limited to using fixing bands 56, 60 with crimped portions 62, 64 formed therein. Rather, any other means may be used, so long as the large diameter cylindrical portion 50 and the small diameter cylindrical portion 52 can reliably and tightly be fastened onto the outer peripheral wall of the tubular member 30 and the peripheral side wall of the spline shaft 10.

Figure 10:
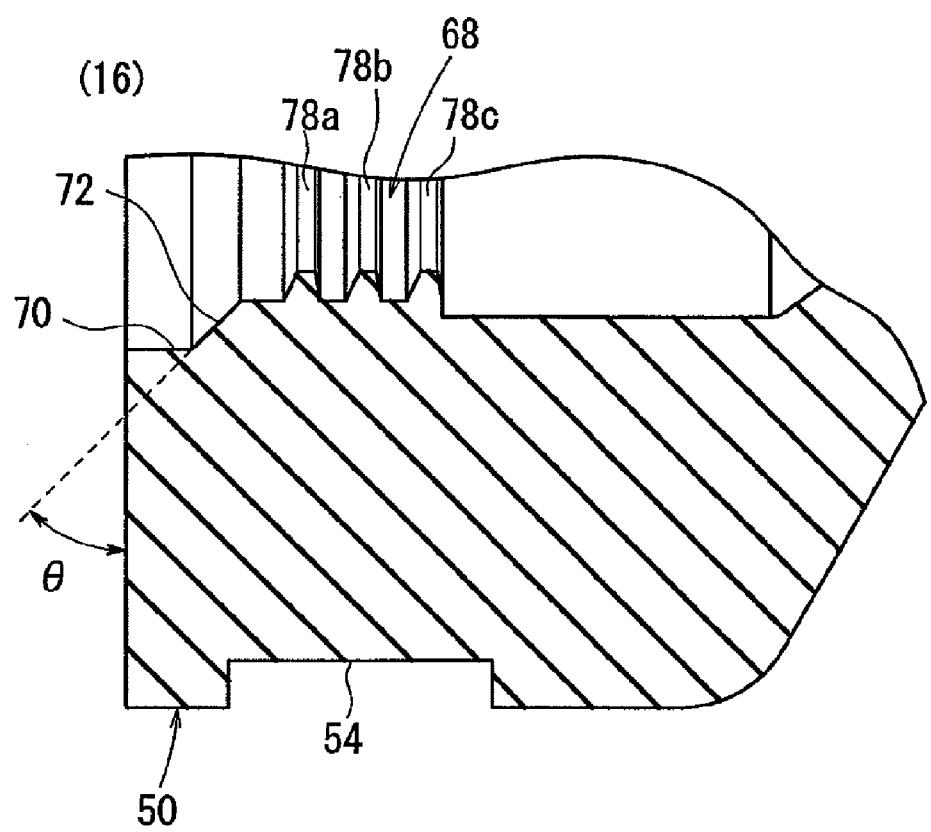
FIG. 10 is an enlarged cross-sectional view taken along line X-X in FIG. 5.

FIG. 10 is an enlarged cross-sectional view taken along lines X-X in FIG. 5. The same reference numerals are used in FIG. 5 and FIG. 6. An additional description of the reference numerals in FIG. 10 has been omitted.

The invention claimed is:

1. A joint boot comprising a large diameter cylindrical portion that is tightly fastened onto an outer peripheral wall of an outer member of a constant velocity universal joint, a small diameter cylindrical portion that is tightly fastened onto a side peripheral wall of a shaft member, and a bellows that intervenes between said large diameter cylindrical portion and said small diameter cylindrical portion, the bellows becoming reduced in diameter from said large diameter cylindrical portion toward said small diameter cylindrical portion, wherein said large diameter cylindrical portion has a thin-walled part with a smaller inner diameter as compared with an opening, wherein a first tapered part is provided between said opening and said thin-walled part, whereby an inner diameter of said large diameter cylindrical portion becomes reduced in diameter toward said small diameter cylindrical portion, wherein a thick-walled part, which is inserted into an axially extending recess disposed on an outer peripheral wall of said outer member, is disposed on an inner peripheral wall of said large diameter cylindrical portion, wherein said thick-walled part has a second tapered part starting from an end of said opening, whereby the internal diameter of said large diameter cylindrical portion becomes reduced in diameter toward said small diameter cylindrical portion, said second tapered part extending circumferentially over said first tapered part and having the same reduced diameter ending point as that of the first tapered part; and a constant diameter part that extends from the opening and continues to said first tapered part in a direction perpendicular to the circumferential direction in said large diameter cylindrical portion.

2. The joint boot according to claim 1, wherein said first tapered part and said second tapered part are inclined at the same angle.

3. The joint boot according to claim 1, wherein the reduced diameter ending point of said first tapered part and said second tapered part lies within a range of a widthwise dimension of an installation groove for a fastening member, which is disposed on an outer peripheral wall of said large diameter cylindrical portion.

* * * * *

UNITED STATES PATENT AND TRADEMARK OFFICE
CERTIFICATE OF CORRECTION

| | |
|---|---|
| PATENT NO. | : 7,775,891 B2 |
| APPLICATION NO. | : 11/666815 |
| DATED | : August 17, 2010 |
| INVENTOR(S) | : Masafumi Yamamoto et al. |

Page 1 of 1

It is certified that error appears in the above-identified patent and that said Letters Patent is hereby corrected as shown below:

ON THE TITLE PAGE:

At Item (22), please change:

"(22)   PCT Filed:    Nov. 18, 2004"

to

--(22)   PCT Filed:    Nov. 18, 2005--.

Signed and Sealed this

Twenty-third Day of November, 2010

David J. Kappos
*Director of the United States Patent and Trademark Office*